United States Patent
Cachin et al.

(10) Patent No.: US 9,936,004 B2
(45) Date of Patent: Apr. 3, 2018

(54) NETWORK INTERFACE FOR TRANSMITTING PROTECTION DATA OF A POWER NETWORK

(71) Applicant: ABB Technology AG, Zürich (CH)

(72) Inventors: Dominique Cachin, Winterthur (CH); Christian Leeb, Zürich (CH)

(73) Assignee: ABB Schweiz AG, Baden (CH)

( * ) Notice: Subject to any disclaimer, the term of this patent is extended or adjusted under 35 U.S.C. 154(b) by 348 days.

(21) Appl. No.: 14/577,210

(22) Filed: Dec. 19, 2014

(65) Prior Publication Data

US 2015/0180954 A1 Jun. 25, 2015

(30) Foreign Application Priority Data

Dec. 20, 2013 (EP) .................................. 13198953

(51) Int. Cl.
| | |
|---|---|
| G06F 15/16 | (2006.01) |
| H04L 29/08 | (2006.01) |
| H04L 12/40 | (2006.01) |
| H04L 12/707 | (2013.01) |
| H04L 12/723 | (2013.01) |

(52) U.S. Cl.
CPC ........ *H04L 67/10* (2013.01); *H04L 12/40176* (2013.01); *H04L 45/24* (2013.01); *H04L 45/50* (2013.01)

(58) Field of Classification Search
CPC ... H04L 67/10; H04L 12/40176; H04L 45/24; H04L 45/50
USPC ......................................................... 709/218
See application file for complete search history.

(56) References Cited

U.S. PATENT DOCUMENTS

| | | | | |
|---|---|---|---|---|
| 6,560,234 B1* | 5/2003 | Ben-Michael | ...... | H04L 12/2801 370/401 |
| 6,810,010 B1* | 10/2004 | Matsukawa | ....... | H04L 12/40189 370/219 |
| 7,830,883 B1* | 11/2010 | Fromm | ............... | H04L 12/4658 370/392 |
| 8,886,476 B1* | 11/2014 | Taft | ........................ | H04B 3/542 700/286 |

(Continued)

FOREIGN PATENT DOCUMENTS

WO   WO 2013/030276 A1   3/2013

OTHER PUBLICATIONS

European Search Report dated May 28, 2014.
(Continued)

*Primary Examiner* — Douglas Blair
*Assistant Examiner* — Tan Doan
(74) *Attorney, Agent, or Firm* — Taft Stettinius & Hollister LLP

(57) ABSTRACT

A network interface is disclosed for redundant coupling of a substation communication network and a packet-switched WAN of a power network. The interface device can include: a first redundancy module having: two LAN ports connectable with the Substation communication network, and a first interface port; a second redundancy module having: two WAN ports connectable with the WAN, and a second interface port; and a first interworking module connecting the first with the second redundancy module via the first and the second interface port, and adapted to forward protection data between the first and the second redundancy module.

20 Claims, 3 Drawing Sheets

(56) References Cited

U.S. PATENT DOCUMENTS

| | | | |
|---|---|---|---|
| 2008/0175142 A1* | 7/2008 | Uematsu | G06F 11/2007 370/220 |
| 2013/0223204 A1* | 8/2013 | Angst | H04L 41/0668 370/218 |
| 2014/0177477 A1* | 6/2014 | Cachin | H04L 45/128 370/256 |
| 2017/0195260 A1* | 7/2017 | Ma | H04L 49/552 |

OTHER PUBLICATIONS

IEC ED—IEC: "Part 3: Parallel Redundancy Protocol (PRP) and High-availability Seamless Redundancy (HSR)" Internet Citation Dec. 31, 2010, XP002680227, pp. 1-62.

Huynh et al., "Resilience technologies in Ethernet", Computer Networks, Elsevier Science Publishers, B.V., Amsterdam, NL, vol. 54, No. 1, Jan. 15, 2010, pp. 57-78.

Mueller et al., "Possible enhancements of a seamless redundancy protocol and its benefits for open power system applications", Energy Conference and Exhibition, Dec. 18, 2010, pp. 722-727.

Hoga, "Seamless communication redundancy of IEC 62439", Advanced Power System Authomation and Protection, Oct. 16, 2011, pp. 489-494.

* cited by examiner

NETWORK INTERFACE FOR TRANSMITTING PROTECTION DATA OF A POWER NETWORK

FIELD OF THE INVENTION

The invention relates to the field of transmission of protection data of a power network between the substation communication network and packet-switched WAN of the power network, in particular, a network interface for redundant coupling of the substation communication network and packet-switched WAN of the power network.

BACKGROUND OF THE INVENTION

WO 2013/030276 describes a method for protecting Ethernet based critical data services during the transport over Ethernet based wide area networks WAN. The traffic in the source edge node of the WAN is duplicated by means of parallel redundancy protocol PRP. Both duplicates are sent via a fully redundant path over the WAN. In order to predefine such redundant path, multiple spanning tree protocol MSTP is used. In the destination edge node of the WAN, the duplicated packets are detected, and the first one to the intended data sink is sent while the second one that arrives is eliminated. This corresponds to the standard PRP functionality. The arrival of both entities of the same information, i.e. duplicated packets, is constantly checked in order to monitor the availability of both paths through the WAN. This also corresponds to standard PRP functionality.

PRP is a standardized protocol that can be used to duplicate Ethernet based traffic, send it over two distinct paths or networks, and based on predefined fields in the PRP packets eliminate duplicates.

FIG. 1 shows the current situation of non-Ethernet, non IEC61850 based communication of critical service, e.g. to protection relays, using legacy protocols such as E1, C37.94, X21, binary I/O or similar, between the interface of the WAN edge communication device to devices of the application of the critical service. The information of the critical data service to be transmitted is only converted to Ethernet based traffic inside an interworking function IWF inside the communication device.

DESCRIPTION OF THE INVENTION

It is an objective of the invention to provide a network interface for redundant coupling of the substation communication network and packet-switched WAN of the power network. Preferably, the network interface is also redundant in order to minimise the single point of failure issues in respect of network connection.

It is further an objective of the invention to obtain the similar results by duplicating Ethernet packets but using a proprietary rather than standardized protocol to add the extra information which is used by the receiver in order to detect and eliminate the duplicates.

It is further an objective of the present invention to use multiprotocol label switching (MPLS) as an alternative to MSTP in order to engineer redundant path through a wide area network, since this technology has become the dominant technology for future WAN.

Inside the substations, the use of redundant LAN technologies is in early considerations and application to such technologies can be expected to be the standard case in near to middle future. Technologies under consideration are mainly PRP and high-availability seamless redundancy HSR. It is further an objective of the present this invention to provide a solution for a redundant communication system for Ethernet based critical services between two or more locations is introduced with less or no single point of failure in the entire system.

The present invention utilizes the local area networks to be either according to the redundancy standard PRP or HSR, and a redundancy of the WAN according to WO 2013/030276. The present invention introduces a hardware interface solution that for these cases can be distributed over several, redundant hardware modules.

These objective are achieved by a device according to the independent claims. Preferred embodiments are evident from the dependent patent claims.

The present invention provides a network interface device for transmitting protection data of a power network between a Substation communication network and a WAN of the power network, comprising: a first redundancy module comprising: two LAN ports connectable with the Substation communication network, and a first interface port; a second redundancy module comprising: two WAN ports connectable with the WAN, and a second interface port; and a first interworking module connecting the first with the second redundancy box via the first and the second interface port, and adapted to forward protection data between the first and the second redundancy module. The two LAN ports can provide connections to the Substation LAN via two independent path, i.e. enabling redundancy of Substation LAN connection. The Substation communication network may comprise one Substation LAN or two Substation LANs. In other words, the two LAN ports may be both connected with one Substation LAN or with two different Substation LANs. Similarly, The two WAN ports may also enable redundancy of WAN connection.

Preferably, the first redundancy module is adapted to identify a data packet and a duplicate of the data packet received by the LAN ports and to discard the data packet or the duplicate, and the second redundancy module is adapted to duplicate the data packet received from the second interface port, and the duplicated data packets is tagged.

Preferably, the second redundancy module is adapted to discard a data packet or a duplicate of the data packet received from the WAN ports, and the first redundancy module is adapted to duplicate the data packet received from the first interface port.

Preferably, the first redundancy module is adapted to discard a data packet or a duplicate of the data packet received from the LAN ports, and the second redundancy module is adapted to duplicate the data packet received from the second interface part.

Preferably, the first redundancy module is a high-availability seamless redundancy HSR redbox, and the second redundancy module is a parallel redundancy protocol PRP redbox.

Preferably, the interface device further comprises a MPLS protocol engine arranged between the second redundancy module and the WAN, wherein the MPLS protocol engine comprises two MPLS tagging units configured to add different MPLS tags to the data packet and the duplicate of the data packet. The different MPLS tags are indicative of the redundant WAN paths which are physically separated network connection wires.

Preferably, one of the LAN ports of the first redundancy module is inactive and the two WAN ports of the second redundancy module are active. In this case, the interface module towards to the Substation LAN functions transparently, i.e. the first redundancy module works as a connection line and does not provide any redundancy. The data packets forwarded from the interworking module will be duplicated by the second redundancy module and tagged with different MPLS tags towards WAN.

According to a preferred embodiment, the present invention provides a network interface system for transmitting protection data of a power network between a redundant Substation communication network and a redundant WAN of the power network, comprising a first and a second network interface device as above described, wherein each of the second redundancy modules has only one WAN port active.

Preferably, each of the first and the second redundancy modules of the first network interface device has only one LAN or WAN port active. In this case, the first and the second redundancy modules may be connected with different Substation LANs, which can be redundant LANs. In both interface devices, the data packets are forwarded from the first redundancy module via the interworking module to the second redundancy module towards the WAN with different MPLS tags.

Preferably, each of the first redundancy modules of the first and second network interface device has one LAN port active towards the Substation communication network, and the other LAN ports of the first redundancy modules of the first and second network interface device are inter-connected with each other, and wherein each of second redundancy modules of the first and second network interface device has only one WAN port active.

Preferably, the first redundancy modules of the first and second network interface device are high-availability seamless redundancy HSR redboxes, and the second redundancy modules of the first and second network interface device are parallel redundancy protocol PRP redboxes.

Preferably, the first redundancy boxes of the first and second network interface device are adapted to identify a data packet and a duplicate of the data packet received by the LAN ports, wherein only the first of the two copies, i.e. the data packet and the duplicate, is allowed to pass, the other copy is discarded. There is a translation e.g. from HSR to PRP format, where care has to be taken that in the new format, the same identifier for copies should to be used as present in the IISR format. This is the key that this format translation can be done in two different, i.e. redundant hardware modules. Moreover, the network interface system may further comprise a MPLS protocol engine with two MPLS tagging units configured to add different MPLS tags to the data packet and the duplicate of the data packet, respectively.

BRIEF DESCRIPTION OF THE DRAWINGS

The subject matter of the invention will be explained in more detail in the following text with reference to preferred exemplary embodiments which are illustrated in the attached drawings, in which.

The reference symbols used in the drawings, and their primary meanings, are listed in summary form in the list of designations. In principle, identical parts are provided with the same reference symbols in the figures.

DETAILED DESCRIPTION OF PREFERRED EMBODIMENTS

As mentioned, PRP is a standardized redundancy protocol that could relatively easily be substituted by a proprietary protocol. A generic formulation could be: in the source node of a redundant data service, duplicate the data packet to be sent over the redundant medium; and add at appropriate place in the packet, e.g. as header or tailor to the payload the information that is required by the destination node to identify the duplicate of a packets and to discard the duplicate.

In order to route duplicated information over two fully redundant path in a meshed WAN, the MPLS could be used to build up such two fully redundant paths. The communication source node would then need to add the two related but different MPLS tags to the two copies of each data packet in order to make sure that inside the MPLS core of the WAN, the two copies of the same information are routed via the two redundant paths.

Figure 1:
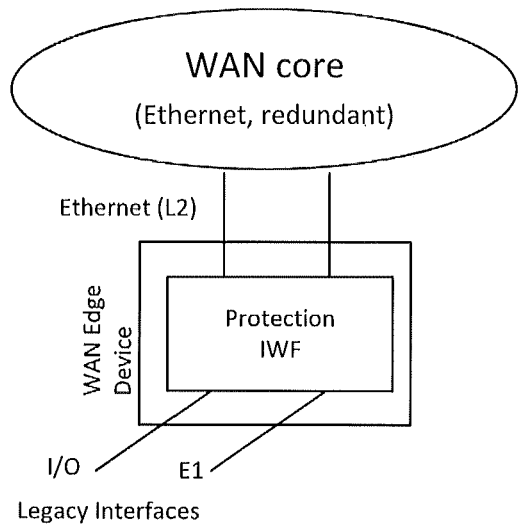
FIG. 1 schematically shows a legacy interface to redundant WAN core.
Figure 2:
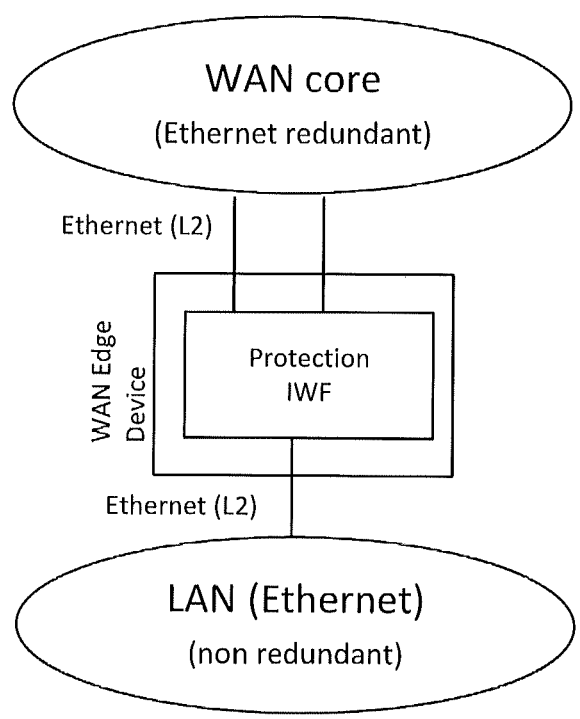
FIG. 2 schematically shows GOOSE and SV tunneling approach according to IEC 61850-90-1, wherein there are two redundant WAN connections.

FIG. 2 shows a possible solution where the interface between the WAN edge device and the devices of the application of the critical service is Ethernet based, e.g. Ethernet based protection services according to IEC61850, GOOSE or SV. However this local Ethernet based connection is not redundant. The basic function of the IWF in FIG. 2 according is therefore to accept critical data packets from the non-redundant substation LAN, duplicate them using e.g. PRP and extend them with the additional routing information required for the non-redundant transport over the WAN, e.g. a VLAN tag in the case of MSTP or a MPLS tag in case of MPLS. In particular, the function of duplicating/removing duplicates cannot be distributed over more than one hardware module. As a result, in a system according to FIG. 2, the WAN communication is redundant and failure tolerant, however the interface hardware, the IWF, as well as the local communication inside the LAN/substation is non-redundant and both are single point of failures in the system.

Figure 3:
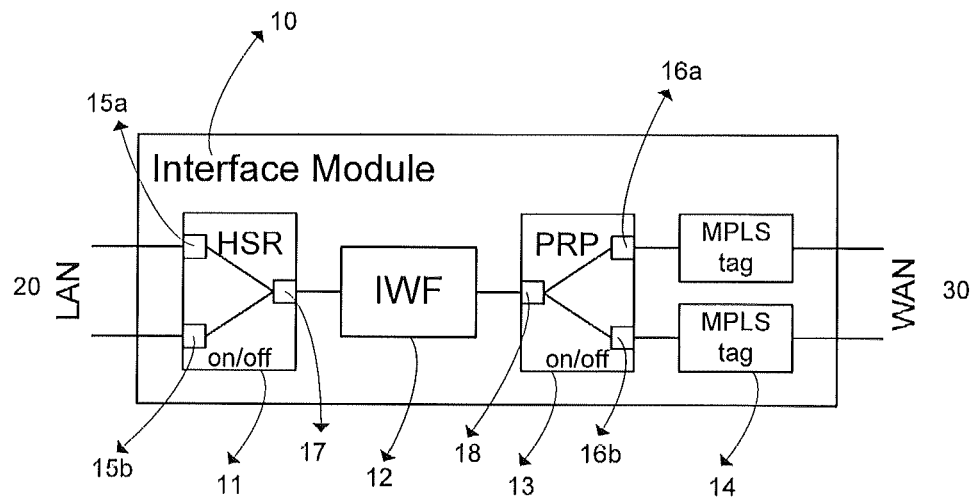
FIG. 3 schematically shows an interface device for redundant coupling of WAN and Substation communication network according to a preferred embodiment of the present invention.

In order to further improve redundancy of the connectivity to Substation LAN and WAN, the present invention provides an interface device as shown in FIG. 3.

FIG. 3 shows a HSR redbox 11 towards the LAN 20 that can be configured to be off or inactive, i.e. only one port towards the LAN 20 is active and packets are passed through without any modification or function in both directions. The HSR redbox 11 can operate in the special HSR-to-PRP mode where redundant HSR traffic is converted to one of the two instances of redundant PRP traffic or vice versa.

A teleprotection function, i.e. interworking function IWF 12, for additional functions can be executed on the Ethernet based critical data service. Additional functions are for instance constant supervision of the quality of the communication channel for a protection service, event recorder for binary commands coded in GOOSE messages, on the fly modification of GOOSE and SV messages such as VLAN ID, MAC addresses or similar as eventually requested by different configurations of the two substations on both ends or authentication/verification of Ethernet based messages on the border between Substation LAN and Wide Area Network.

A PRP redbox 13 can be configured to be off or inactive, i.e. only one port towards the WAN 30 is active and packets are passed through without any modification or function in both directions. The PRP redbox 13 can operate in the standard PRP mode and duplicated non redundant traffic towards the WAN 30 or removing duplicates in the direction from the WAN 30 towards the LAN 20.

A MPLS protocol engine 14 can convert Layer 2 Ethernet to MPLS, i.e. Layer 2.5, and add different MPLS tags to the two copies of a data service in order to make sure the two instances are routed via redundant paths in the WAN 30.

Figure 4:
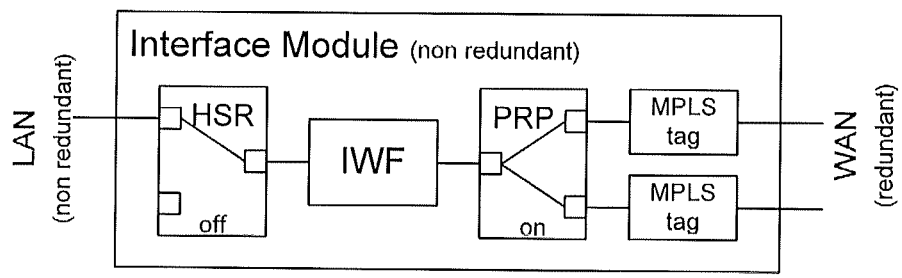
FIG. 4 schematically shows an interface device for redundant coupling of WAN and Substation communication network according to a use case of the present invention.

Based on this interface device, three exemplary use cases can be defined in order to connect non-redundant or redundant LAN architectures to a redundant WAN:

FIG. 4 shows a non-redundant substation LAN and a non-redundant hardware coupling. In this case, there is no redundant traffic from substation LAN 20 and the interface module itself is not redundant. The HSR redbox 11 towards the LAN 20 is off, i.e. single, non-redundant coupling to the LAN. The PRP redbox 13 is on, i.e. traffic is duplicated. Both copies of the duplicated traffic are tagged with a different MPLS tag and are sent in redundant manner over the redundant MPLS core WAN 30.

Figure 5:
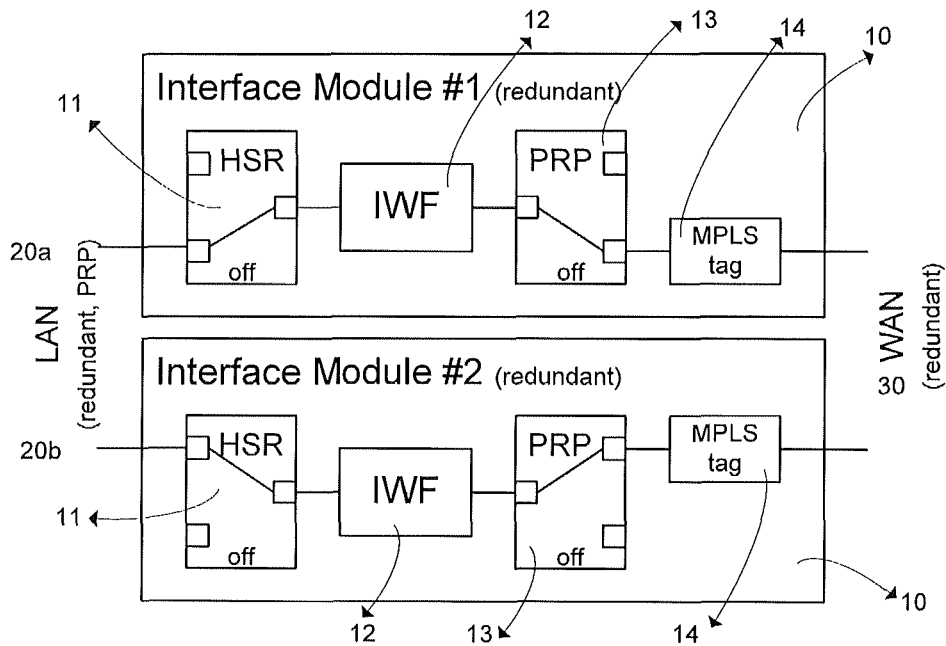
FIG. 5 schematically shows an interface device for redundant coupling of WAN and Substation communication network according to a more preferred embodiment of the present invention.

FIG. 5 shows the usage of the interface device for redundant substation LAN 20 according to PRP. Here, the present application uses two redundant interface modules 10 at same time. On both modules 10, the HSR redbox 11 towards the LAN 20 is off. The two LAN interfaces 15a and 15b of the two modules 10 are connected to the two redundant PRP LANs 20a, 20b. On both modules 10, the PRP redbox 13 towards the WAN 30 is off. Both modules handle one of the copies from the PRP protocol only. The traffic on both modules 10 is tagged with a different MPLS tag and sent in redundant manner over the redundant MPLS core WAN 30. This embodiment provides a full redundant solution, i.e. redundant LAN communication, interface hardware and WAN communication, without single point of failure.

Figure 6:
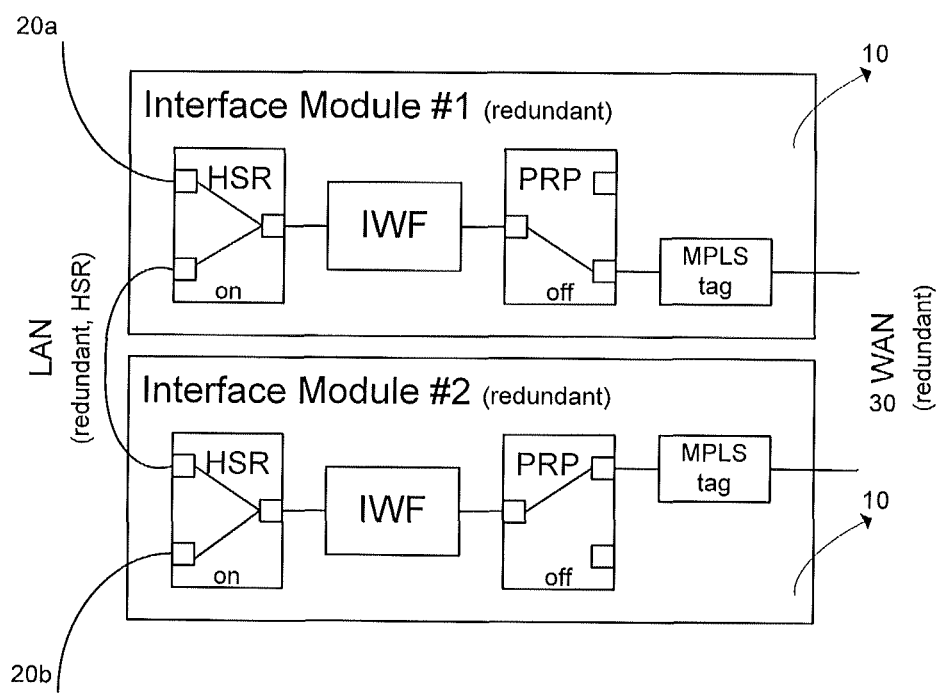
FIG. 6 schematically shows an interface device for redundant coupling of WAN and Substation communication network according to a more preferred embodiment of the present invention.

FIG. 6 shows the usage of the interface device for redundant substation LAN 20 according to HSR. Here, the present application also uses two redundant interface modules 10 at the same time. On both modules, the HSR redbox 11 towards the LAN 20 is configured to operate in the HSR-to-PRP mode, i.e. HSR is converted to one of the two instances of a redundant PRP traffic and vice versa. Moreover, on both modules, PRP redbox 13 towards the WAN is off. Both modules handle one of the copies from the PRP protocol only. The traffic on both modules is tagged with a different MPLS tag and sent in redundant manner over the redundant MPLS core WAN. The preferred embodiment provides a full redundant solution, i.e. redundant LAN communication, interface hardware and WAN communication, without single point of failure.

Many communication edge devices of WAN cores are built up in hardware redundant manner. For the two use cases illustrated in FIGS. 5 and 6 for coupling a redundant HSR or PRP LAN to a redundant WAN communication, both hardware modules 10 that are required according to the present invention could therefore be present in the same, HW redundant communication device. Still, the entire chain, including LAN, communication edge device as well as WAN communication are still fully redundant without any single point of failure.

While the invention has been described in detail in the drawings and foregoing description, such description is to be considered illustrative or exemplary and not restrictive. Variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. The mere fact that certain elements or steps are recited in distinct claims does not indicate that a combination of these elements or steps cannot be used to advantage, specifically, in addition to the actual claim dependency, any further meaningful claim combination shall be considered disclosed.

LIST OF DESIGNATIONS

10 network interface device
11 first redundancy module
12 interworking function, interworking module, teleprotection function
13 second redundancy module
14 MPLS engine
15a LAN port
15b LAN port
16a WAN port
16b WAN port
17 interface port
18 interface port
20 Substation communication network, Substation LAN
20a Substation LAN A
20b Substation LAN B
30 WAN

The invention claimed is:

1. A network interface device for transmitting redundant protection data of a power network between a Substation communication network and a WAN of the power network, comprising:
   a first redundancy module having: two LAN ports connectable with the Substation communication network, and a first interface port, the first redundancy module being configured to transmit and/or receive redundant data from each of the two LAN ports;
   a second redundancy module having: two WAN ports connectable with the WAN, and a second interface port, the second redundancy module being configured to transmit and/or receive redundant data from each of the two WAN ports; and
   a first interworking module connecting the first redundancy module with the second redundancy module via the first and the second interface ports, and configured to forward the redundant data between the first and the second redundancy modules
   wherein the redundant data comprises two copies of the same information where one of the two copies is routed through each of the two LAN ports and/or each of the two WAN ports.

2. The network interface device according to claim 1, wherein the first redundancy module is configured to identify a data packet and a duplicate of the data packet received by the LAN ports and to discard the data packet or the duplicate, and wherein the second redundancy module is configured to duplicate the data packet received from the second interface port, and the duplicated data packets are tagged.

3. The network interface device according to claim 1, wherein the second redundancy module is configured to discard a data packet or a duplicate of the data packet received from the WAN ports, and wherein the first redundancy module is configured to duplicate the data packet received from the first interface port.

4. The network interface device according to claim 1, wherein the first redundancy module is configured to discard a data packet or a duplicate of the data packet received from the LAN ports, and wherein the second redundancy module is configured to duplicate the data packet received from the second interface port.

5. The network interface device according to claim 4, wherein the first redundancy module is a high-availability seamless redundancy HSR redbox, and the second redundancy module is a parallel redundancy protocol PRP redbox.

6. The network interface device according to claim 5, comprising:
a MPLS protocol engine configured to be arranged between the second redundancy module and the WAN, wherein the MPLS protocol engine includes two MPLS tagging units configured to add different MPLS tags to a data packet and a duplicate of the data packet.

7. The network interface device according to claim 6, configured to operate with one of the LAN ports of the first redundancy module being inactive and the two WAN ports of the second redundancy module being active.

8. The network interface device according to claim 7, configured to operate with one of the WAN ports of the second redundancy module being inactive and the two LAN ports of the first redundancy module being active.

9. The network interface device according to claim 1, wherein the first redundancy module is a high-availability seamless redundancy HSR redbox, and the second redundancy module is a parallel redundancy protocol PRP redbox.

10. The network interface device according to claim 1, comprising:
a MPLS protocol engine configured to be arranged between the second redundancy module and the WAN, wherein the MPLS protocol engine includes two MPLS tagging units configured to add different MPLS tags to a data packet and a duplicate of the data packet.

11. The network interface device according to claim 10, wherein the first redundancy modules of the first and second network interface devices are high-availability seamless redundancy HSR redboxes, and the second redundancy modules of the first and second network interface devices are parallel redundancy protocol PRP redboxes.

12. The network interface device according to claim 1, configured to operate with one of the two LAN ports of the first redundancy module being inactive and the two WAN ports of the second redundancy module being active.

13. The network interface device according to claim 1, configured to operate with one of the two WAN ports of the second redundancy module being inactive and the two LAN ports of the first redundancy module being active.

14. A network interface system for transmitting redundant protection data of a power network between a redundant Substation communication network and a redundant WAN of the power network, comprising:
a first and second network interface devices, each network interface device comprising:
a first redundancy module having: two LAN ports connectable with the Substation communication network, and a first interface port, the first redundancy module being configured to transmit and/or receive redundant data from each of the two LAN ports;
a second redundancy module having: two WAN ports connectable with the WAN, and a second interface port; and
a first interworking module connecting the first redundancy module with the second redundancy module via the first and the second interface ports, and configured to forward the redundant data between the first and the second redundancy modules;
wherein the redundant data comprises two copies of the same information where one of the two copies is routed through each of the two LAN ports; and
wherein each second redundancy module is configured to operate with only one WAN port active.

15. The network interface system according to claim 14, configured to operate with each of the first and the second redundancy modules of the first network interface device having only one LAN or WAN port active.

16. The network interface system according to claim 14, configured to operate with each of the first redundancy modules of the first and second network interface devices having one LAN port active towards the Substation communication network, and other LAN port of the first redundancy modules of the first and second network interface devices are inter-connected with each other, and wherein each of second redundancy modules of the first and second network interface devices are configured to operate with only one WAN port active.

17. The network interface system according to claim 14, wherein the first redundancy modules of the first and second network interface devices are configured to identify a data packet and a duplicate of the data packet received by the LAN ports, and wherein the network interface system comprises:
a MPLS protocol engine with two MPLS tagging units configured to add different MPLS tags to the data packet and the duplicate of the data packet, respectively.

18. A network interface system, comprising:
first and second network interface devices, each network interface device comprising:
a first redundancy module having: two LAN ports configured to be connected with the Substation communication network, and a first interface port, the first redundancy module being configured to transmit and/or receive redundant data from each of the two LAN ports;
a second redundancy module having: two WAN ports configured to be connected with the WAN, and a second interface port, the second redundancy module being configured to transmit and/or receive redundant data from each of the two WAN ports; and
a first interworking module connecting the first redundancy module with the second redundancy module via the first and the second interface ports, and configured to forward the redundant data between the first and the second redundancy modules;
wherein the redundant data comprises two copies of the same information where one of the two copies is routed through each of the two LAN ports and/or each of the two WAN ports; and
wherein the first redundancy modules of the first and second network interface devices are high-availability seamless redundancy HSR redboxes, and the second redundancy modules of the first and second network interface devices are parallel redundancy protocol PRP redboxes.

19. The network interface system according to claim 18, wherein the first redundancy modules of the first and second network interface devices are configured to identify a data packet and a duplicate of the data packet received by the LAN ports, and wherein the network interface system comprises:

a MPLS protocol engine with two MPLS tagging units configured to add different MPLS tags to the data packet and the duplicate of the data packet, respectively.

20. A network interface system according to claim 19, wherein the network interface system transmits protection data of a power network between a redundant Substation communication network and a redundant WAN of the power network, and wherein each second redundancy module is configured to operate with only one WAN port active.

* * * * *